United States Patent [19]

Mitchell

[11] 4,158,480
[45] Jun. 19, 1979

[54] AUTOMATIC STEREOSCOPE

[76] Inventor: Edmund Mitchell, 526 S. St. Joseph St., South Bend, Ind. 46601

[21] Appl. No.: 808,402

[22] Filed: Jun. 20, 1977

[51] Int. Cl.² .............................................. G02B 27/22
[52] U.S. Cl. .................................................... 350/133
[58] Field of Search ....................... 350/130, 133–135; 353/18; 40/457

[56] References Cited

U.S. PATENT DOCUMENTS

| | | | |
|---|---|---|---|
| 365,256 | 6/1887 | Horton | 350/134 |
| 963,841 | 7/1910 | Whiting | 350/134 |
| 2,296,765 | 9/1942 | Brost | 350/134 |
| 2,679,705 | 6/1954 | Rainous | 350/134 |
| 2,897,721 | 8/1959 | Cohn et al. | 350/135 |
| 3,027,802 | 4/1962 | Larson | 350/134 |
| 3,245,156 | 4/1966 | DeBloois et al. | 353/18 |
| 3,484,160 | 12/1969 | Glass et al. | 353/7 |
| 3,731,999 | 5/1973 | Vantre | 353/18 |

*Primary Examiner*—John K. Corbin
*Assistant Examiner*—Scott J. Sugarman

[57] ABSTRACT

An audio-visual device that combines synchronized programs of narration and music with direct viewing of illuminated 35mm stereoscopic transparencies presented in automatic progression. The device features four innovations in particular: 1. Endless-loop reels in which the stereo mounts themselves serve as the basic "hardware," requiring no belts, discs, frames, drums or cylinders for support, and simplified for expeditious removal and compact storage to solve the many problems of inventory and program change-over. 2. Jam-proof transmission for advancing slides intermittently, comprised of a sprocketed drive wheel and a 4-vane "paddle-wheel," with meshing cogs so spaced and positioned as to remain constantly "in gear," never "out of gear." 3. A tape playback system that compensates for variable differences in the speed of the viewer motor and the tape playback motor, by re-synchronizing itself at the beginning of each new cycle so that sight and sound coincide automatically no matter how often the cycle is repeated. 4. Expandable design for adding viewer outlets, when the objective is to serve groups of patrons disposed to see and hear the same performance at the same time, akin to an audience in a small movie theater. Comprising the basic component of this extension, a rotatable shaft is coupled to the main idler shaft in the unit, to carry an optional plurality of impellers and reels.

4 Claims, 3 Drawing Figures

AUTOMATIC STEREOSCOPE

This invention relates to a coin-operated 3-dimensional viewer for stereoscopic slides organized in reels and synchronized with stereophonic sound track of words and music—said apparatus designed to recycle automatically, and to accommodate a plurality of persons of diverse stature, each of whom can view identical exhibits and hear the same commentary and read the same captions simultaneously as in a theater, advantages that overcome the existing limitations of hand-held electric viewers.

The main object of the invention resides in the provision of a stereoscopic device which has the potential to entertain and educate and which can be profitably used in public—with periodic program changes—in airports, shopping plazas, travel agencies, libraries, miniature theaters, etc.

A further object of the invention is vested in the provision for correct alignment of sight and sound by means of a compensating system which makes automatic re-cycling feasible.

The object of the invention also embraces a simplified means for organizing slides into reels with precise alignment, reducing the possibility of eye-discomfort.

A further object is the provision of a reliable and easy-to-make mechanism for bringing each slide into the viewing area with eye-pleasing smoothness and gentleness of motion.

I also aim to provide through my invention the workable means for operating miniature 3-D theaters, having rows of stereoscopic viewers to serve many patrons, and performing with practical efficiency through a single control center.

Inasmuch as the marketing potential calls for a plurality of these stereoscopic machines, each requiring a plurality of reels, my invention brings into its scope a plan to solve the problem of duplicating the reels without departing from the quality of the original transparencies.

All these and other objects and problems are resolved in a novel combination of parts and sequence of functions which will now be fully described in the specifications and drawings, and will be selectively re-stated in the claims.

The working model which I have contructed accommodates two persons simultaneously. The accompanying drawings illustrate such a 2-viewer model, but the design can be adapted for one viewer only, or expanded to accommodate many additional persons, using the same functional apparatus.

Figure 3:
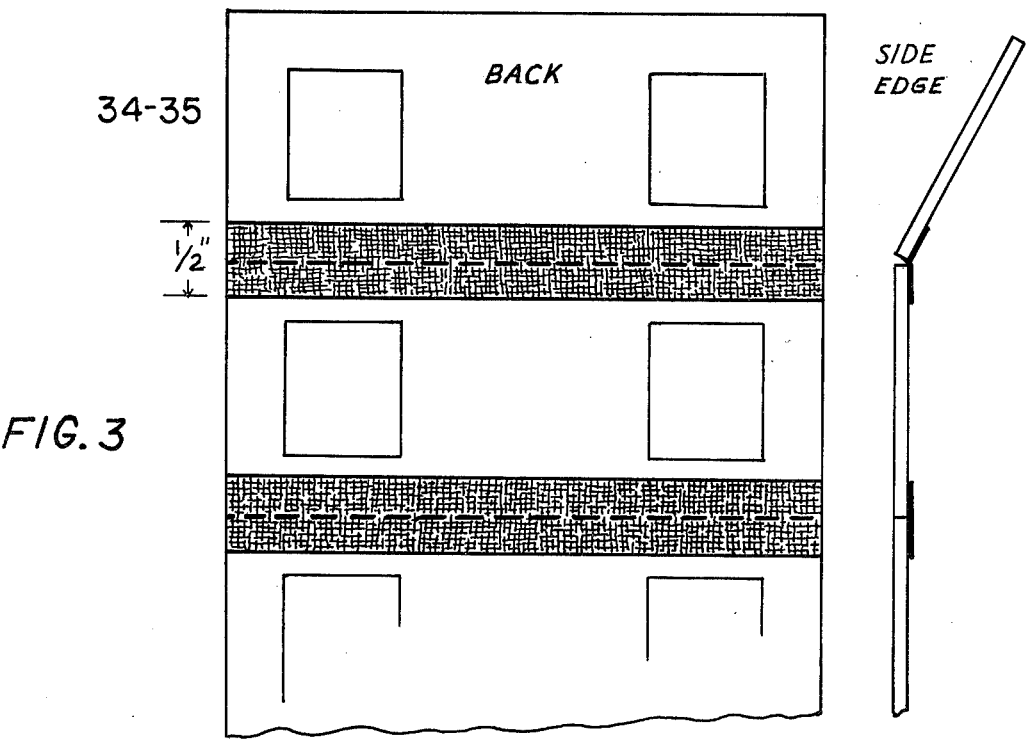

FIG. 3 consists of detailed views showing how the stereo mounts are hinged and combined into endless reels.

Figure 1:
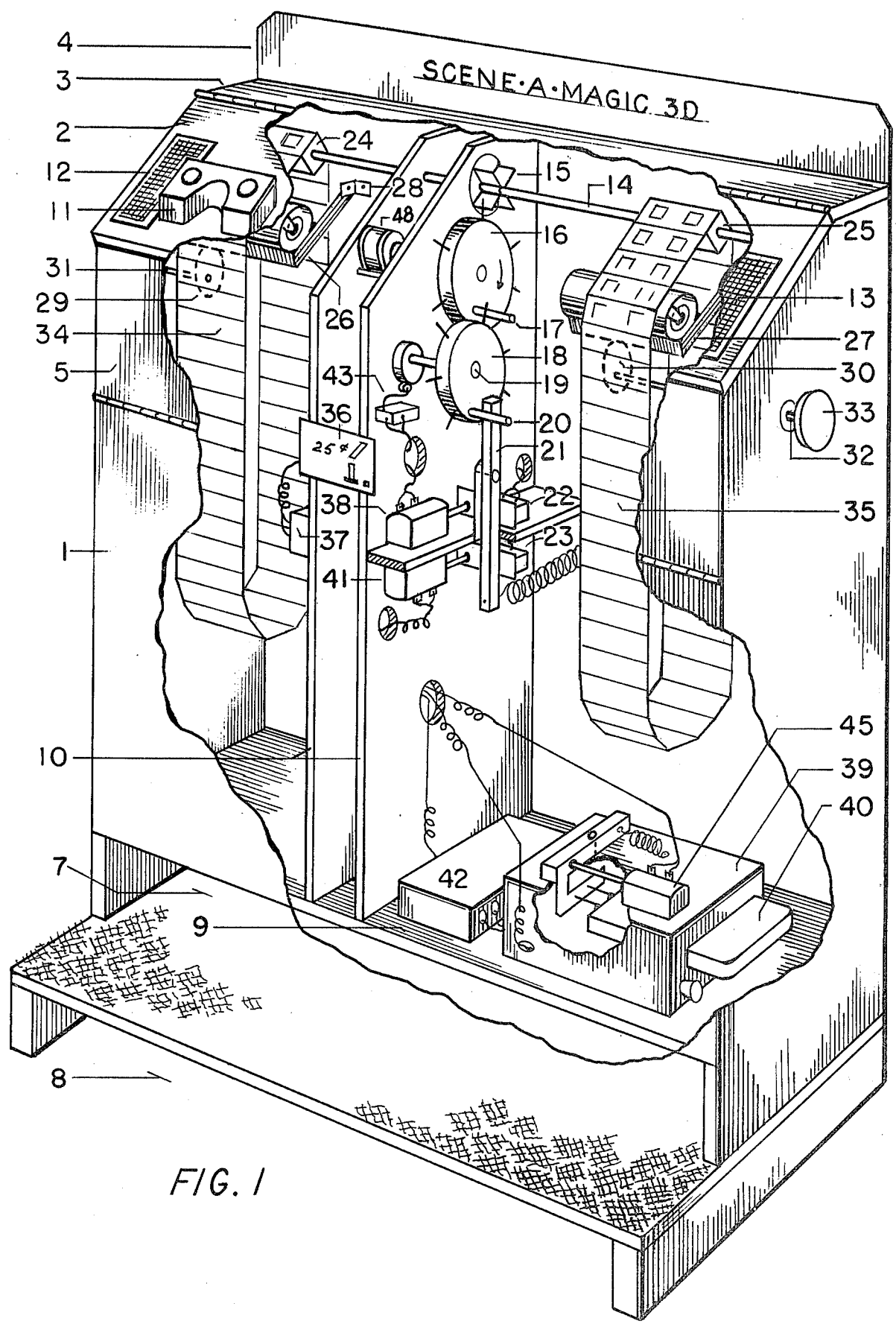
FIG. 1 is a perspective view of my invention which I have named "Scene-a-Magic 3-D". The broken-out exterior reveals the principal operating components and their relative positions within the cabinet.

Referring in particular to FIG. 1, the cabinet 1 is equipped with a hinged panel 2; a ledge 3 at the top to hold personal belongings such as purses, eye-glasses, hats, etc.; a back-stop display panel 4; a second hinged panel 5 (both panels 2 and 5 open wide for servicing and can be locked for security); a carpeted platform designed to serve three functions: a foot rest, an elevated floor for persons of short stature, and a structural ballast for vertically stabilizing the entire cabinet; spaces 7 and 8 to allow room for the feet; interior floor space 9 to house electrical appliances; and two dividing vertical panels 10 on the interior to support working parts and form a conduit for electrical wires.

Panel 2 incorporates two stereoscopic heads (only one can be seen, at 11), with sufficient space in between to provide personal shoulder room. Each viewing head is equipped with a pair of stationary stereoscopic lenses.

Panel 2 is also the locale of three loudspeakers—two end speakers (12 and 13), and one in the middle. The end speakers are rated 4 ohms each, and the one in the middle is rated 8 ohms.

Now looking at the interior, 14 is a rotatable idler shaft that extends through the full width of the cabinet and is journaled in the sidewalls. It is equipped with a 4-vaned "paddle-wheel" 15.

Below the "paddle-wheel" is a large sprocketed wheel 16, mounted on a motor shaft turned by motor 48 which is geared down for slow motion. In my working model, the sprocket-wheel 16 has six sprockets (⅛-inch rods extending ¾-inch from the wood rim).

the number of sprockets may vary, and the idividual sprockets may or may not be spaced apart equally. Unequal spacing diversifies the viewing time, if so desired. Changing the number of sprockets will increase or decrease the exposure time for each slide.

Wheel 16 has a horizontally-extended rod 17 near the rim. This rod engages another series of sprockets on sprocket-wheel 18, keyed onto an idler shaft 19 that is tightly journaled and is rotated in small sectors for a total of one revolution per cycle. In the working model, wheel 18 has seven sprockets which do the counting of the slides—6×7 making 42 in the working model.

As in wheel 16, sprocket-wheel 18 also has a horizontally-extended rod 20. The function of rod 20 is to act as tripper of the large vertical lever 21, which is a spring-loaded time-delay lever that operates two switches 22 and 23 simultaneously—the switching action taking place only after the completion of a cycle.

Referring back to the uppermost portion of the mechanism, two slide-chain impellers 24 and 25 are keyed onto the rotatable idler shaft 14, and are aligned under the two stereoscopic viewing heads. The impellers are in effect square pulleys 4" wide (the width of standard stereo mounts).

Also aligned under each viewing head is a vertically-movable carriage, 26 and 27, each with two small lamps. A built-in reflector illuminates the transparencies and provides indirect light for captions. The highest point on the carriage is a curved aluminum band in the middle, over which the slide chain glides, and which lifts up the slides to proper viewing distance from the lenses.

The viewing distance is adjustable: extension arms on the carriage are hinged at the rear of cabinet with pivots, as indicated at 28. The carriages are supported in front by cams 29 and 30. The cams are wheels with off-center hubs, keyed onto rods 31 and 32 which are manually turned by knobs as indicated at 33, allowing an infinity of settings in either direction and having no terminal stoppers which might be damaged by over-exertion or willful mischief. (The focus-adjusting knobs, one for each stereoscopic head, are the only movable parts accessible to the public.)

The slides to be exhibited are linked into reels as shown at 34 and 35. The mounts are regimented into an endless chain simply by hinging them with opaque selfadhesive tape, about ⅜" wide, on the back side. See FIG. 3. The tape segments are applied horizontally to the top and bottom edges of the butted mounts, successively, and the alignment is automatically precise.

The importance of accurate alignment is found in the fact that acute eye-discomfort may result whenever any slide under observation is not perfectly lined up with the horizontal position of the twin lenses.

The final locking strip of tape is applied after the concatenated series has been strung over the impeller and the focusing assembly. When changing reels, removal is accomplished by simply cutting through any "hinge" any place in the chain, and peeling off the remnants. New tape can be applied repeatedly, even on the same mounts. Editing corrections and substitutions can likewise be made.

Subsequently I will refer again to the problem of reel duplication. An integral part of the solution is custom mounting of the transparencies. Plain mounts with no printing are essential, but the most important feature of the available mounts is their squared perfection, making self-alignment possible in the reel-making system I have devised.

The starting circuit of "Scene-a-Magic 3D" includes a coin acceptor 36 with coin return, a non-resetting coin counter at 37, and a push-type solenoid 38 which turns on the main switch. Included in the circuit that stays permanently energized during a cycle is a coin-blocking continuous-duty solenoid which closes the coin slot until the cycle is completed. (Only one person pays, but another can join any time to see the show in progress, through the second stereoscopic head, at no further charge.)

At the bottom of the cabinet interior, 39 is a low-cost 12-voltDC 8-track tape player of the type commonly used in automobiles, modified to eliminate the track-changer and to substitute special circuitry that is employed to stop the player at a pre-determined moment without removal of tape cartridge 40. A sensing patch on the tape triggers the energy which activates stop-switch solenoid 41.

The 12vDC converter for the 8-track player is indicated at 42.

A cam-and-switch combination 43 on idler shaft 19 plays an important part in controlling the stop-and-start circuit of the 8-track system, by preventing the sensing patch from being electrically locked on "dead center".

Figure 2:
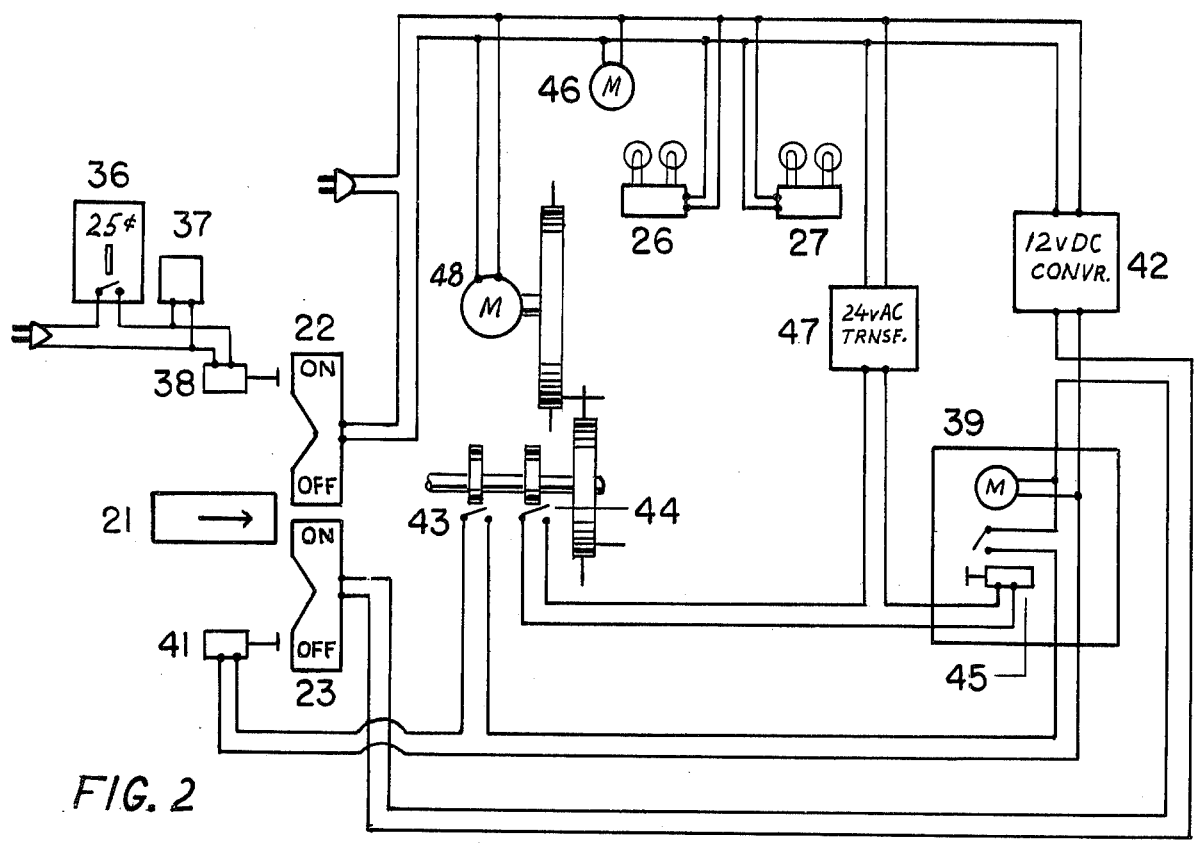
FIG. 2 represents the wiring schematic and flow-sequence of operating functions.

A similar cam-and-switch combination (44 in FIG. 2) on the same idler shaft opens a circuit to retract the sensor within the player mechanism, the object being to save the tape from becoming crinckled overnight or during any other extended period of non-use. The retractor mechanism 45 is indicated on top of the player housing 39 (FIG. 1 and 2).

To prevent excessive heat build-up in the cabinet enclosure during repeated operations, the back wall of the cabinet has air vents top and bottom and a miniature cooling fan (46 in FIG. 2) powered by an extremely quiet-running motor (hysteresis synchronous) with a motor-starting capacitor wired into the circuit.

In the operation of Scene-a-Magic 3D, the long shaft 14 with the 4-vane "paddle-wheel" is in motion only for the brief interval when one of the sprockets on wheel 16 pushes against a vane on wheel 15 and paddles it ¼-turn, causing the next stereo slide to enter the viewing area. And because sprocket-wheel 16 is relatively large and slow-moving, a time interval ensues when the slide impellers are completely at rest.

In the working model, with 42 slides per reel, the rest period lasts about eight seconds per slide, and all the motion in between the rest periods is so gentle that it does not interfere with viewing enjoyment.

By the time the 42 slides have been transported to the viewing area, the horizontal rod 20 on wheel 18 moves against the vertical lever 21, putting this spring-loaded lever under tension. When the trigger-rod clears the top of the lever, the stored energy in the lever is released against two switches 22–23 simultaneously: one switch turns off all the current and the other resets the tape player switch into the starting mode, having been turned off a few seconds previously. Now the stage is set once again for re-cycling.

The reason for the switching complication toward the end of the cycle is the problem of keeping sight and sound in alignment cycle after cycle. Variable differences in the speed of the viewer motor and the tape player may cause slippage in synchronization. This possibility is intercepted by an automatic compensating system.

The leeway for correction is established by programming the end of the sound to occur a few seconds before the viewing cycle is completed. Toward the end of a cycle, the pictorial content may be slightly in advance or slightly in arrear of the sound track, but start-up time is always precisely coincidental. Thus, each cycle of sound is automatically re-synchronized at the start of each new viewing cycle, thereby preventing any accumulation of timing deficiencies.

Two other switching operations take place within each cycle. During the first five minutes of a cycle (the cycles last about 5 minutes-48 seconds), the sensor in the tape player remains retracted. But the micro-switch at 44-FIG. 2 closes a solenoid circuit which brings the sensor into contact with the running tape; and when the sensing patch arrives, the sensor contacts are closed, the tape player is turned off, and the sensor once again recedes, thereby saving the tape from becoming kinked during non-use. The cam at 44-FIG. 2 reduces the "on" time of the retractor circuit to a mere few seconds, thus minimizing the heat build-up from the solenoid.

During the same interval, at about the 5-minute mark, a switch-and-cam combination 43 on the same shaft closes one of the openings in another solenoid circuit which turns off the tape player whenever the sensing patch arrives at the sensor and completes the circuit.

Afterwards, this solenoid circuit is again re-opened by the retrograde action of the cam, rendering the circuit incapable of holding the stop-sensor in the closed position when the tape player is again called on to start.

All of these steps and functions can be seen in sequential order in the schematic depicted in FIG. 2. Starting at 36, the insertion of a coin momentarily pulses the starting circuit, including the coin counter 37 and a solenoid 38 which pushes the main switch 22 "on," thus permanently energizing the main circuit. Once this circuit is energized, current then flows to all the other circuits as needed: first to the viewer motor 48, and to tape player 39 through the 12vDC converter 42; also simultaneously to the two pairs of lamps in the lamp carriages 26–27 and to the cooling fan 46. Later, after about 5 minutes, current flows through the 24vAC transformer 47 to the retractor solenoid 45 activated by cam action at 44.

When the sensing patch in the tape player closes the sensor contacts, and when the cam-actuated switch at 43 is in closed position, current flows to the 12vDC solenoid 41, turning off the switch 23, opening the 12vDC circuit which stops the tape player motor.

As an alternative, the latter result can be achieved by harnessing solenoid 41 to a spring-loaded time-delay lever which acts upon the stopswitch only after the sensing patch has traveled beyond the sensor contacts. That arrangement is more direct, but noisier.

Lever 21, as previously explained, turns off the main current and also resets the tape player switch for a new cycle.

Not shown is a branch of the 24vAC circuit which goes back to the coin acceptor to operate the coin-blocking solenoid.

Referring now to the process of reel duplication, the initial plan was to use Kodachrome stereo slides, and to have duplicates made from the many thousands taken all over the United States and Canada.

The duplicates seem adequate when projected, but when seen at close range through the highly-magnifying lens of an electric steroscopic viewer, the duplicated transparencies reveal a dismaying fall-off in quality. The answer of course is color negative film, like Kodacolor. But no service is available to process Kodacolor for stereo.

A solution was found in #5247—a 35mm Eastman film introduced lately and now widely used in the production of motoin pictures. Specialized color laboratories process the film when used in 35mm still cameras. Each positive duplicate is as good as the next, since they are all made from an original negative.

Of course this means re-photographing on #5247 all the scenic areas that are already on Kodachrome. But our file now contains thousands of #5247 slides and more are being made each year.

Commercial mounting service is not available for #5247 in the stereo format. The processed film comes back in 5-foot strips. But the mounts are available, and are precisely cut to exacting standards.

It is planned to have "Grand Canyon" as the first public showing of Scene-a-Magic 3D, to be followed by "Colorado," "Hawaii," "Bryce Canyon," "Zion," et al.

In the description of my invention I have set forth specific details of construction particularly with reference to a working model. However, I do not wish to make the specifications seem so rigid as to preclude the possibility of developing variations and expanding or reducing the applied uses of Scene-a-Magic 3D, all within the spirit of my invention and the general scope of my claims.

I claim improvements as follows:

1. In the category of automatic stereoscopes, a combination of electro-mechanical parts and sequence of functions designed for a plurality of stereoscopic heads and comprising a multi-vaned "paddle-wheel" keyed onto an idler shaft; a motor-driven sprocket-wheel to propel the "paddle-wheel" intermittently; a second sprocket-wheel rotated in small sectors by a single horizontal rod extending from the rim of the motordriven sprocket-wheel; a spring-loaded time-delay lever activated by a horizontal trigger-rod on the second sprocket-wheel, operating two switches simultaneously; a hingeably mounted carriage under each stereoscopic head with lamps and reflector, surmounted in the middle by a smooth curved band over which the slide mounts glide into position; a supporting cam-rod-and-knob assembly under each carriage for making focal adjustments; a plurality of stereoscopic heads with loudspeakers adjacent to each viewing head; a means for hinging and combining stereo slides into an endless chain; a wide pulley aligned under each viewing head, with multiple flat surfaces constituting an impeller for the slide reel; an audio system that makes possible the use of any 8-track car stereo, modified to make the sensor retractable, and to permit stopping the movement of the tape at a precise moment without removal of the tape cartridge; a cam-and-switch combination to reduce the "on" time of the solenoid that brings the sensor into contact with the moving tape; another cam-and-switch combination to limit the "on" time for the tape player's stop-circuit, or alternately a combination of stop-solenoid and spring-loaded time-delay lever, to prevent the sensing patch from locking the circuit electrically on dead center; a cooling fan; a coin acceptor with coin return slot, a non-resetting coin counter, and a blocking solenoid to close the coin slot after the cycle has started; and housing for all components in a cabinet designed to accommodate a plurality of viewing persons of diverse stature.

2. In the category of automatic stereoscopes, a combination of electro-mechanical parts and sequence of functions designed for one stereoscopic head and comprising a multi-vaned "paddle-wheel" keyed onto an idler shaft; a motor-driven sprocket-wheel to propel the "paddle-wheel" intermittently; a second sprocket-wheel rotated in small sectors by a single horizontal rod extending from the rim of the motor-driven sprocket-wheel; a spring-loaded time-delay lever activated by a horizontal trigger-rod on the second sprocket-wheel, operating two switches simultaneously; a hingeably mounted carriage under the stereoscopic head with lamps and reflector, surmounted in the middle by a smooth curved band over which the slide mounts glide into position; a supporting cam-rod-and-knob assembly for making focal adjustments; a single stereoscopic head with adjacent loudspeakers; a means for hinging and combining stereo slides into an endless chain; a wide pulley aligned under the viewing head, with multiple flat surfaces constituting an impeller for the slide reel; an audio system that makes possible the use of any 8-track car stereo, modified to make the sensor retractable, and to permit stopping the tape at a precise moment without removal of the tape cartridge; a cam-and-switch combination to reduce the "on" time of the solenoid that brings the sensor into contact with the moving tape; another cam-and-switch combination to limit the "on" time for the tape player's stop-circuit, or alternately a combination of stop-solenoid and spring-loaded time-delay lever, to prevent the sensing patch from locking the circuit electrically on dead center; a cooling fan; a coin acceptor with coin return slot and non-resetting coin counter; and housing for all components in a cabinet designed to accommodate one viewing person.

3. In the category of automatic stereoscopes, a combination of electro-mechanical parts and sequence of functions designed for expanded application of Scene-a-Magic 3D into rows of stereoscopic viewers in a miniature theater, attended by an operator and ticket-taker, and comprising for the "control row" a multi-vaned "paddle-wheel" keyed onto a row-length idler shaft; a motor-driven sprocket-wheel to propel the "paddle-wheel" intermittently; a second sprocket-wheel rotated in small sectors by a single horizontal rod extending from the rim of the motor-driven sprocket-wheel; a spring-loaded time-delay lever activated by a horizontal trigger-rod on the second sprocket-wheel, operating two switches simultaneously; a hingeably mounted carriage under each stereoscopic head with lamps and reflector, surmounted in the middle by a curved band over which the slide mounts glide into position; a supporting camrod-and-knob assembly under each carriage for making focal adjustments; a means for hinging and combining stereo slides into an endless chain; a wide pulley aligned under each stereoscopic head, with multiple flat surfaces constituting an impeller for the slide reel; an audio system that makes possible the use of any 8-track car stereo (one for the entire theater), modified to make the sensor retractable and to permit stopping the tape at a precise moment without removal of the tape cartridge; a cam-and-switch combination to reduce the "on" time of the solenoid that brings the sensor into contact with the moving tape; another cam-and-switch combination to limit the "on" time for the tape player's stop-circuit, or alternately a combination of stop-solenoid and spring-loaded time-delay lever, to prevent the sensing patch from locking the circuit electrically on dead center; a cooling fan; housing for all components in "row cabinets" designed to accommodate a plurality of viewing patrons in standing or seated position; a full complement of working parts centralized in the main control row (in the theater concept), with successive rows stripped-down to slide-transport function only; two loudspeakers in front of the theater to broadcast the sound from the one 8-track cartridge and tape player; and means for starting and re-starting all motors by a single manually-operated momentary switch, or by an interval timer.

4. In the category of automatic stereoscopes, a combination of electro-mechanical parts and sequence of functions designed for expanded application of Scene-a-Magic 3D into rows of stereoscopic viewers in a miniature theater, completely automated, without operators or ticket-takers, and comprising for the main control row a multi-vaned "paddle-wheel" keyed onto a row-length idler shaft; a motor-driven sprocket-wheel to propel the "paddle-wheel" intermittently; a second sprocket-wheel rotated in small sectors by a single horizontal rod extending from the rim of the motor-driven sprocket-wheel; a spring-loaded time-delay lever activated by a horizontal trigger-rod on the second sprocket-wheel, operating two switches simultaneously; a hingeably mounted carriage under each stereoscopic head with lamps and reflector, surmounted in the middle by a smooth curved band over which the slide mounts glide into position; a supporting cam-rod-and-knob assembly under each carriage for making focal adjustments; a means for hinging and combining stereo slides into an endless chain; a wide pulley aligned under each stereoscopic head, with multiple flat surfaces constituting an impeller for the slide reel; an audio system that makes possible the use of any 8-track car stereo (one for the entire theater), modified to make the sensor retractable, and to permit stopping the tape at a precise moment without removal of the tape cartridge; a cam-and-switch combination to reduce the "on" time of the solenoid that brings the sensor into contact with the moving tape; another cam-and-switch combination to limit the "on" time for the tape player's stop-circuit, or alternately a combination of stop-solenoid and spring-loaded time-delay lever, to prevent the sensing patch from locking the circuit electrically on dead center; a cooling fan; housing for all components in "row cabinets" designed to accommodate a plurality of viewing patrons in standing or seated position; a full complement of working parts centralized in the main control row (in the theater concept), with successive rows stripped-down to slide-transport function only; two loudspeakers in front of the theater to broadcast the sound from the one 8-track cartridge and tape player; means for starting and re-starting all motors by a master interval timer; and for each stereoscopic head an individual coin acceptor and timer having the single function of turning on the viewer lights.

* * * * *